US 6,694,671 B2

(12) United States Patent
Vahrmeyer (10) Patent No.: US 6,694,671 B2
(45) Date of Patent: Feb. 24, 2004

(54) CONTAINER WITH FASTENER

(76) Inventor: Ronald Vahrmeyer, P.O. Box 813, Vineland, Ontario (CA), L0R 2C0

( * ) Notice: Subject to any disclaimer, the term of this patent is extended or adjusted under 35 U.S.C. 154(b) by 0 days.

(21) Appl. No.: 09/994,074

(22) Filed: Nov. 27, 2001

(65) Prior Publication Data

US 2002/0100211 A1 Aug. 1, 2002

Related U.S. Application Data

(63) Continuation-in-part of application No. 09/774,805, filed on Feb. 1, 2001.

(51) Int. Cl.⁷ .................................................. A01G 9/02
(52) U.S. Cl. .............................. 47/65.5; 47/66.2; 47/84
(58) Field of Search ............................. 47/66.1, 66.2, 47/66.3, 84, 65.5; 206/423

(56) References Cited

U.S. PATENT DOCUMENTS

| | | | | |
|---|---|---|---|---|
| 198,159 A | * | 12/1877 | Schermerhorn | 47/20.1 |
| 1,493,142 A | * | 5/1924 | Gardner | |
| 1,959,510 A | * | 5/1934 | van Waveren | |
| 2,814,910 A | * | 12/1957 | Reparon | 47/84 |
| 3,631,627 A | | 10/1968 | van Zijverden | |
| 3,704,545 A | * | 12/1972 | Van Reisen | 47/69 |
| 3,869,966 A | * | 3/1975 | Brandigi et al. | |
| 4,019,279 A | * | 4/1977 | Moorman et al. | 47/32.8 |
| 4,124,135 A | * | 11/1978 | Weder et al. | 220/4.21 |
| 4,145,841 A | | 3/1979 | Woolpert | |
| 5,379,499 A | * | 1/1995 | Jackson | 27/1 |
| 5,400,545 A | * | 3/1995 | Medina | 47/84 |
| 5,930,951 A | * | 8/1999 | Wong | 47/66.1 |
| 6,553,714 B2 | * | 4/2003 | Vahrmeyer | 47/65.5 |
| 2002/0100211 A1 | * | 8/2002 | Vahrmeyer | 47/66.2 |
| 2003/0097790 A1 | * | 5/2003 | Vahrmeyer | 47/66.2 |

FOREIGN PATENT DOCUMENTS

| | | | |
|---|---|---|---|
| DE | U 29517828 | | 4/1996 |
| EP | A-0074637 | | 10/1982 |
| EP | 0240641 A2 | * | 10/1987 |
| FR | A-2122819 | | 9/1972 |
| GB | 2138662 A | * | 10/1984 |
| GB | 2277859 A | * | 11/1994 |
| JP | 4-18280 | * | 1/1992 |
| JP | 7-69337 | * | 3/1995 |
| JP | 2001-171640 | * | 6/2001 |
| NL | A-6601800 | | 8/1967 |

* cited by examiner

*Primary Examiner*—Peter M. Poon
*Assistant Examiner*—Jeffrey L. Gellner
(74) *Attorney, Agent, or Firm*—Eugene J. A. Gierczak (57) ABSTRACT

A plant container comprising a lower section, an upper section removably securable to said lower section so as to define a cavity therein, said upper section presenting a top opening communicating with said cavity, fastening means associated with said upper and lower sections for fastening said upper section to said lower section.

4 Claims, 11 Drawing Sheets

CONTAINER WITH FASTENER

This application is a continuation in part of U.S. application Ser. No. 09/774,805 filed on Feb. 1, 2001.

FIELD OF INVENTION

This invention relates generally to containers for plants or shrubs and particularly relates to a container for a bulb and a method of planting a bulb in a container.

BACKGROUND ART

The most popular and common container for potted plants and shrubs is of the type where the top cross-section or volume of earth or nutrient is greater than the bottom. Such tapered pots may comprise of plastic or clay material in a fashion well known to those persons skilled in the art.

Such prior art pots are generally planted by first introducing soil in the bottom section of the tapered plant and then introducing seed or bulbs on top of such soil and thereafter topping up the pot with further soil or nutrient.

Such prior art tapered pots are not generally efficient in terms of providing sufficient volumetric space for the roots of the plant which tend to concentrate at the bottom section of the pot which tapers to provide less and less cross-sectional area towards the bottom of the tapered prior art pots.

Furthermore such prior art pots are generally non-decorative or appealing to look at since they comprise generally of the same shape.

Various attempts have heretofore been made to improve on such prior art tapered pots.

For example U.S. Pat. No. 3,991,516 discloses a segmented container for potted plants and shrubs of the type defining an inverted conical shape or spherical zone segment which provides greater volume of earth at the base of the container than at the top to incur greater and healthier root growth. The container assembly consists of a base and two or more separable upper section shell segments which are separable along a vertical line and having circumferential sealing means.

Moreover U.S. Pat. No. D278,521 relates to an ornamental design for a two part flower container while U.S. Pat. No. 2,834,153 relates to a venting cone for use in the lower part of a flower pot adapted to be positioned over the opening in the bottom thereof comprising an annular rim having spacing nodes extending from the undersurface, a wall having an intermediate portion of interlay strips extending upwardly from the upper edge of the rim, and inperforate cone extending from the upper edge of the wall to the apex of the device.

Moreover U.S. Pat. No. 1,534,508 relates to a device for testing soil or seed comprising a closed frusto-conical container having its end walls formed by removable discs adapted to fit the container body snugly, one of said discs being apertured to permit insertion of seed when the container is charged with soil.

Yet another arrangement is shown in U.S. Pat. No. 4,057,932 which teaches a container split in half longitudinally. The two half sections may be separate, in which case they are held together by the walls of a crate into which a number of the containers are placed. Alternatively the sections may be connected together along their bottom margins by a hinge.

Yet another arrangement is shown in U.S. Pat. No. 4,435,918 which shows a flower pot comprising an upper pot, lower pot, with means that can regulate the water supply to the soil and a means that can adjust the exposed area of the soil to the water, thereby minimizing the unfavourable effect of the drastic changes of the weather.

Yet another arrangement is illustrated in U.S. Pat. No. 5,852,896 which relates to a container and methodology for growing a plant in soil, soil within an area defined by an annular inner wall having an open top end to expose the soil and plant to ambient air; the inner wall includes transverse holes around its circumference and up its length. In one embodiment the inner wall includes a water impervious circumferal band at its upper end to help maintain the soil top surface dry. An outer annular wall of water impervious material laterally surrounds, in spaced relationship, the inner wall to define an open space with upper opening between the walls into which water can be applied and air may flow.

Finally U.S. Pat. No. 4,014,506 relates to a support collar assembly which is designed, primarily to fell a need for a simple, reliable and economical way of suspending and supporting standard flower pots, and the like within any one of a series of larger diametered containers, or within deeper containers.

These and other prior art devices present relatively complicated structures which are not well suited for easily and simply planting seeds, shrubs, bulbs or the like.

It is an object of this invention to provide an improved container, which may be easily used, for planting bulbs of the like.

DISCLOSURE OF INVENTION

It is an aspect of this invention to provide a plant container containing side walls extending from a bottom to a top opening so as to define a cavity, said top opening smaller than said bottom; means for introducing seeds of said plant into said cavity from said bottom.

It is a further aspect of this invention to provide a container for a bulb comprising sidewalls extending generally upwardly and inwardly from a bottom to top opening so as to define a cavity; said bottom including an opening for introducing said bulb into said cavity; removable means for closing said opening.

It is another aspect of this invention to provide a method of planting a bulb in a container having sidewalls extending generally inwardly from a bottom to a top opening so as to define a cavity, said bottom having an opening, comprising the steps of disposing said container upside down with said top opening pointing downward; introducing said bulb into said cavity through said bottom opening where said top opening is smaller than said bulb; filling said cavity with soil; closing said bottom opening; disposing said container right side up.

It is yet another aspect of this invention to provide a method of planting a bulb in a container having upper and lower mating and separable sidewall sections, said mated sidewall sections extending generally inwardly from a bottom surface to a top opening so as to define a cavity, said method comprising the steps of separating said upper sidewall section from said lower sidewall section; placing soil and a bulb into said lower sidewall section; placing said upper sidewall section into registrable mating disposition with said lower sidewall section.

It is another aspect of this invention to provide a plant container comprising a lower section, an upper section removably securable to said lower section so as to define a cavity therein, said upper section presenting a top opening communicating with said cavity; said fastening means associated with said upper and lower sections for fastening said upper section to said lower section.

It is yet another aspect of this invention to provide a plant container comprising: a lower section presenting upstanding sidewall; an upper section presenting upper sidewalls separable from and registrable with said lower sidewalls to define a cavity therein, said upper section presenting a top opening communicating with said cavity; said lower sidewalls presenting a lip means at the upper end thereof; said upper upstanding sidewalls presenting means for capturing said lip means to prevent separation of said upper section from said lower section when lifting said upper section.

It is also an aspect of this invention to provide a method of planting a bulb in a container having a lower section with upstanding sidewalls and an upper section having upper sidewalls and a top opening, said upper section separable from and registrable with said lower section, said lower side walls presenting displaceable means and said upper upstanding sidewalls presenting means for capturing said displaceable means, comprising the steps of introducing a bulb into the confines of said lower upstanding sidewalls; aligning said upper section over said lower section; displacing said upper section and said lower section towards one another from a first separated position to a second locked position where said displaceable means is captured by said capturing means; filling said cavity defined by said lower section and said upper section with soil.

BEST MODE FOR CARRYING OUT THE INVENTION

In the description that follows, like parts are marked throughout the specification and the drawings with the same respective reference numerals. The drawings are not necessarily to scale and in some instances proportions may have been exaggerated in order to more clearly depict certain features of the invention.

Figure 1:
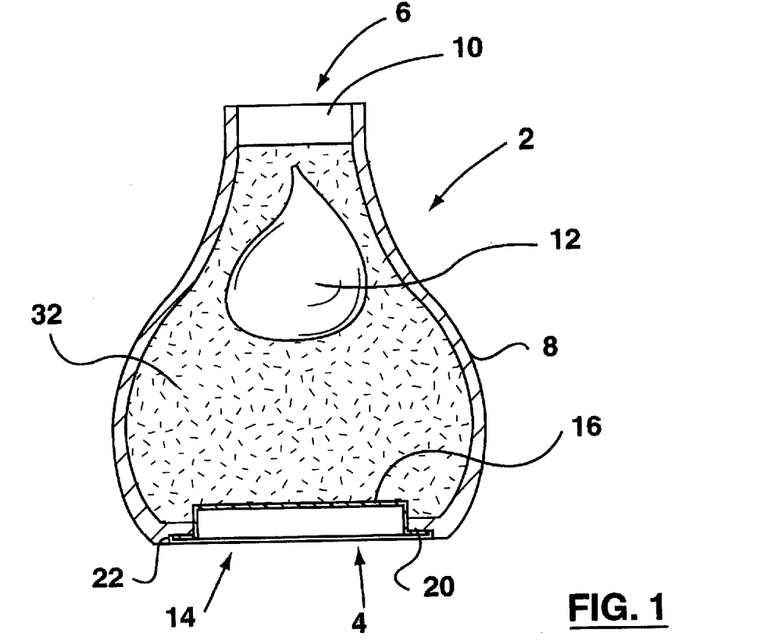
FIG. 1 is a side cross-sectional view of one embodiment of the invention.

FIG. 1 generally illustrates one embodiment of the invention, which illustrates the container 2 having a bottom 4 and a top 6. Sidewalls 8 extend generally upwardly and inwardly from the bottom 4 towards the top 6. The top 6 presents an opening 10, which is generally smaller in size than the bottom 4. Furthermore the top opening 10 is generally smaller in size than the bulb 12, but does not need to be. The plant 12 may comprise of any seeds, shrubs, bulbs or the like. In the embodiment illustrated a bulb has been shown although the invention should not be limited thereto.

The sidewalls 8 extend generally inwardly from the bottom 4 to the top opening 10 so as to resemble the side profile of a bulb.

The bottom 4 in FIG. 1 presents a bottom opening 14. The bottom opening 14 may be closed by the plug 16 as shown in FIG. 1 which is adapted to be inserted in the hole 14 or by a bottom surface 18 shown in FIG. 3 which is adapted to embrace the lower portions of the sidewall 8.

Figure 4:
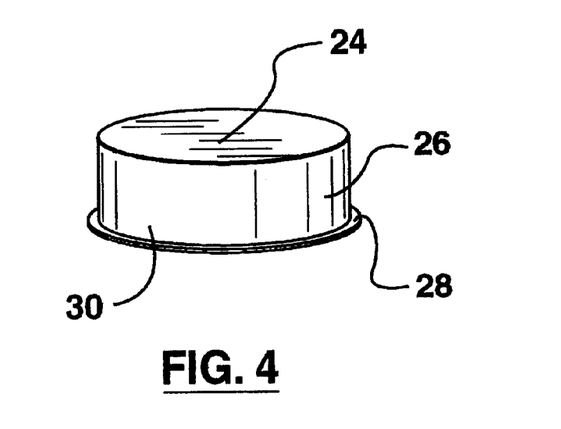
FIG. 4 is a perspective view of a plug.

The hole 14 shown in FIG. 1 provides access into the cavity defined by the sidewalls 8 and may include the shoulder 20 and undercut 22. The plug 16 is more fully shown in FIG. 4 and includes a solid end wall 24, solid circumferential walls 26 extending from the wall 24. The solid circumferential wall 26 includes a radial flange section 28 which is adapted to be received by the undercut 22 as shown in FIG. 1. The inner portion 30 of the plug may be hollow.

Figure 2:
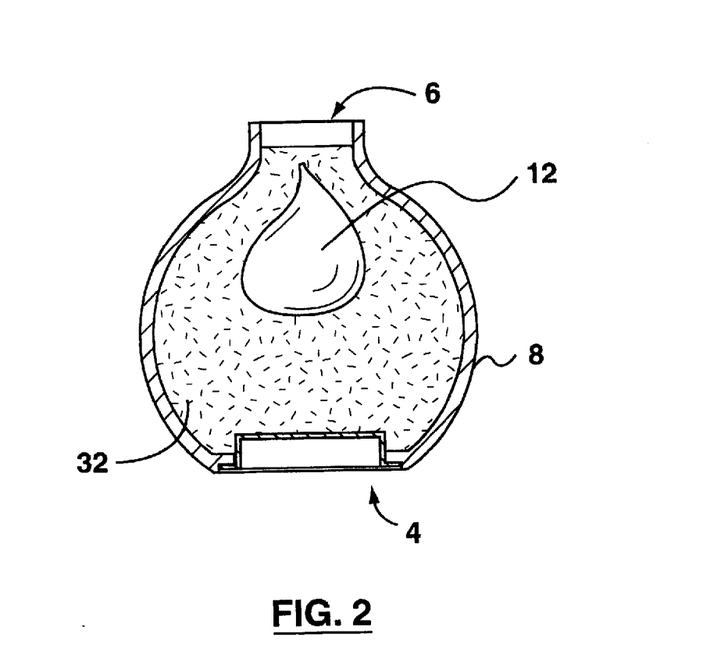
FIG. 2 is a side cross-sectional view of the second embodiment of the invention.

The embodiment shown in FIG. 2 is similar to the embodiment shown in FIG. 1 apart from the side profile of the sidewalls 8 where the sidewalls 8 in FIG. 2 extend generally inwardly from the bottom 4 to the top opening 6.

The configuration shown in FIG. 2 resembles more of a sphere while that in FIG. 1 resembles a bulb.

FIG. 1 includes means for introducing seeds, bulbs or the like into the cavity 32 from the bottom 4. In particular such means comprises the opening 14 at bottom 4 and the removable plug 16 for closing said opening.

Figure 3:
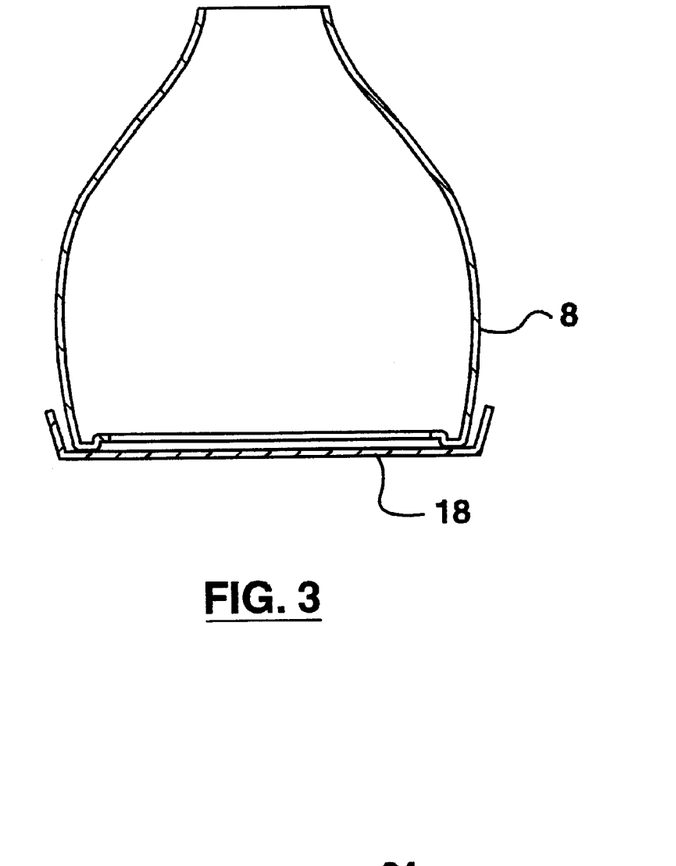
FIG. 3 is a side cross-sectional view of the third embodiment of the invention.

Accordingly FIG. 1 illustrates a method of planting a bulb 12 into a container 2 having sidewalls 8 extending generally inwardly from a bottom 4, a top opening 10 so as to define a cavity 32. Such method includes the steps of disposing the container 2 upside down with the top opening 10 pointing downwardly. Then the bulb 12 is introduced into the cavity 32 through the bottom opening 14 where the top opening 10 is smaller than the bulb so as to prevent the bulb from dropping through the opening. Alternatively, some plant mesh material may be first introduced into the cavity 32 so as to plug the opening 10. Thereafter the bulb 12 may be introduced into the cavity 32 through the opening 14. Thereafter the cavity can be filled with soil and the bottom opening closed. The bottom opening may be closed with the plug 16 as shown in FIG. 1 or the bottom surface 18 as shown in FIG. 3. Thereafter the container 2 is disposed right side up.

The container shown in FIG. 2 may also be used similarly to that shown in FIG. 1 so as to introduce the bulb 12 into cavity 32 as shown in FIG. 2.

The container 2 may be comprised of a variety of materials including clay or plastic. Furthermore the plug 16 or bottom surface 18 may comprise of a variety of materials including plastic or the like.

Figure 5:
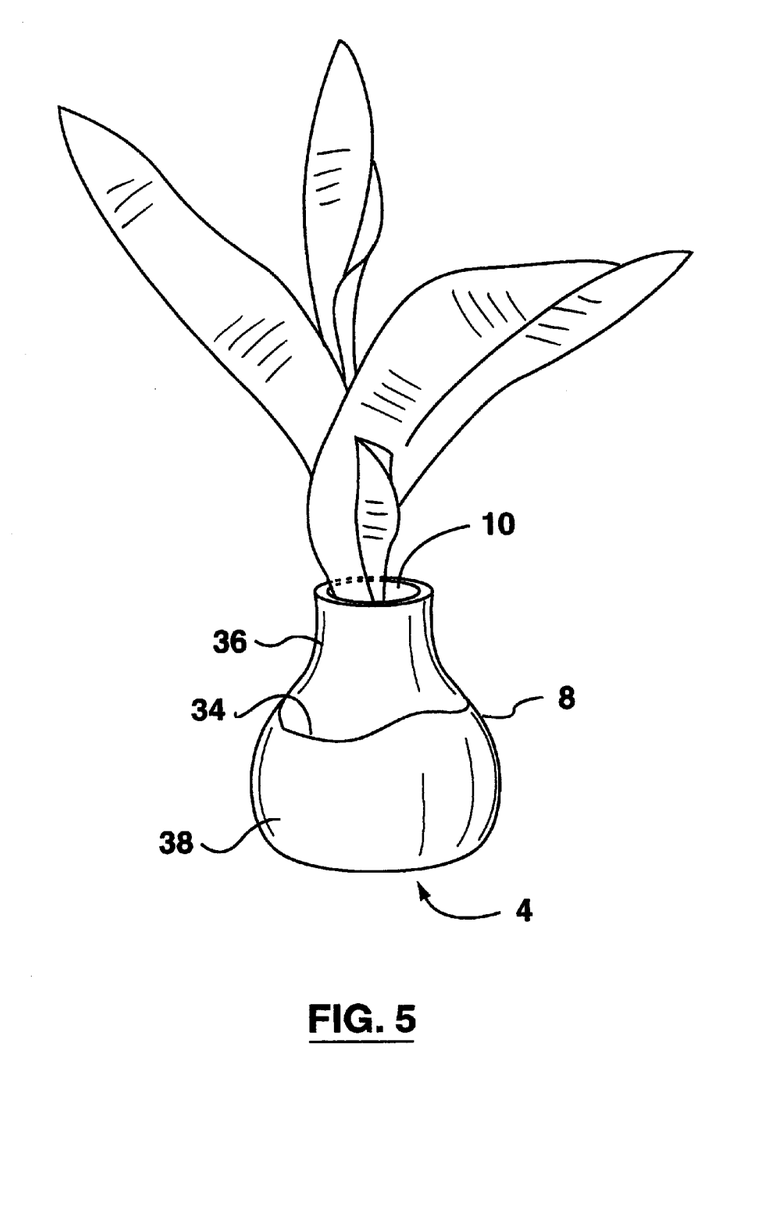
FIG. 5 is a side perspective view of another embodiment of the invention.
Figure 6:
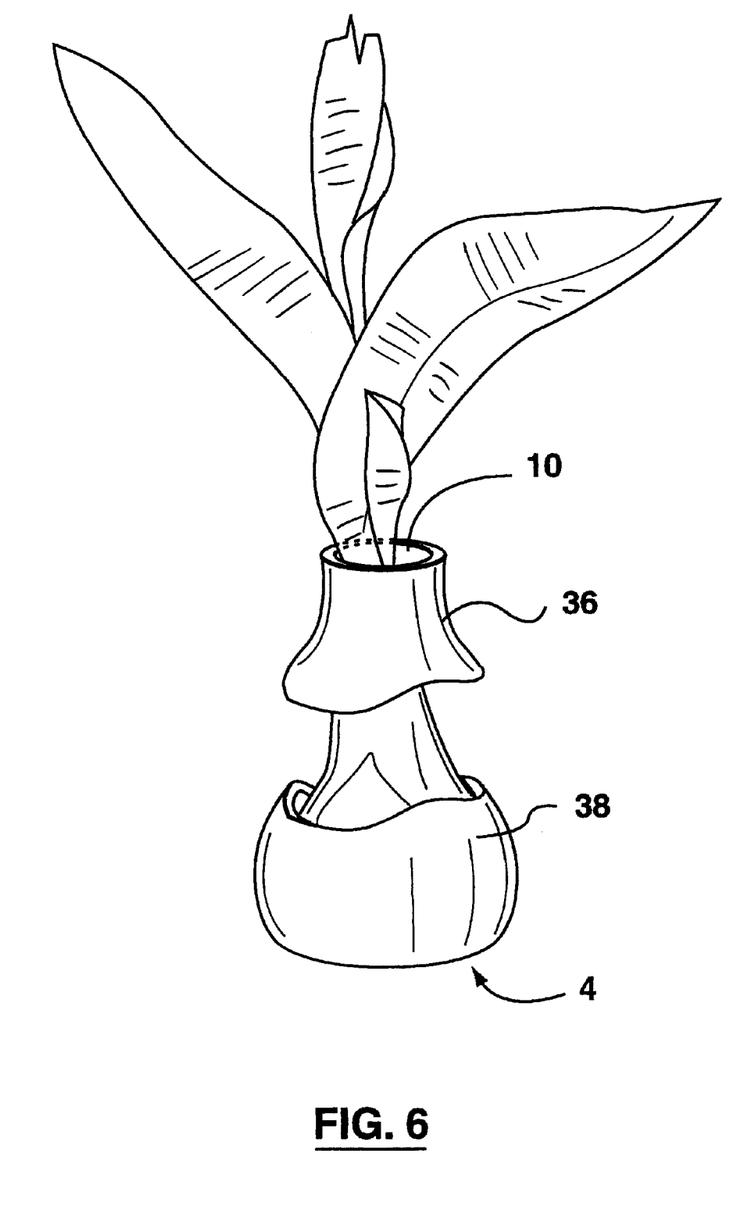
FIG. 6 is a perspective view of FIG. 5 with the upper and lower sidewall sections separated from one another.
Figure 7:
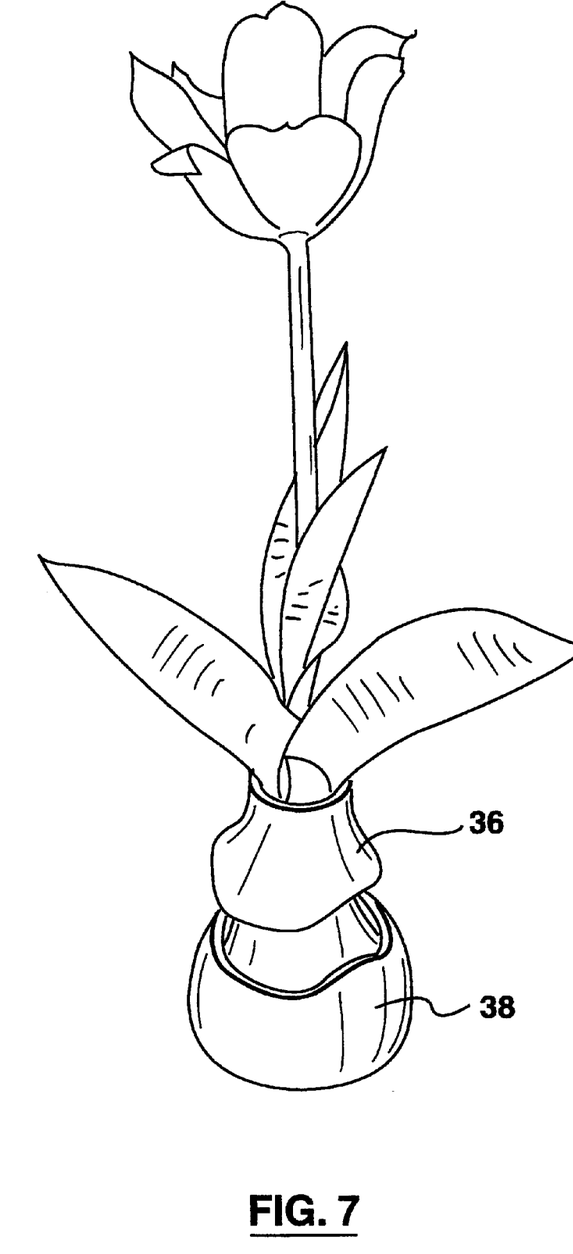
FIG. 7 is a another perspective view of FIG. 6.

FIGS. 5 and 6 illustrate another embodiment of the invention whereby the means for introducing seed or bulb into container 2 comprises a split 34 in the sidewalls 8.

More particularly the embodiment shown in FIGS. 5 and 6 illustrates an upper sidewall section 36 and a lower sidewall section 38. The upper sidewall section presents the top opening 10 while the lower sidewall section 38 presents a bottom 4. In the embodiment shown in FIG. 5 the bottom 4 will generally consist of a solid bottom surface which is integral with a lower sidewall section 38. Alternatively the bottom 4 could include the configuration as shown in FIGS. 1, 2 and 3.

The upper sidewall section 36 is separable from the lower sidewall section 38 as shown in FIG. 6 so as to permit introducing of the bulb or the like into the cavity 32. Furthermore the upper sidewall section is registrable in mating fashion with the lower sidewall section 38 as shown in FIG. 5 so as to contain the bulb 12 in the cavity 32.

Figure 8:
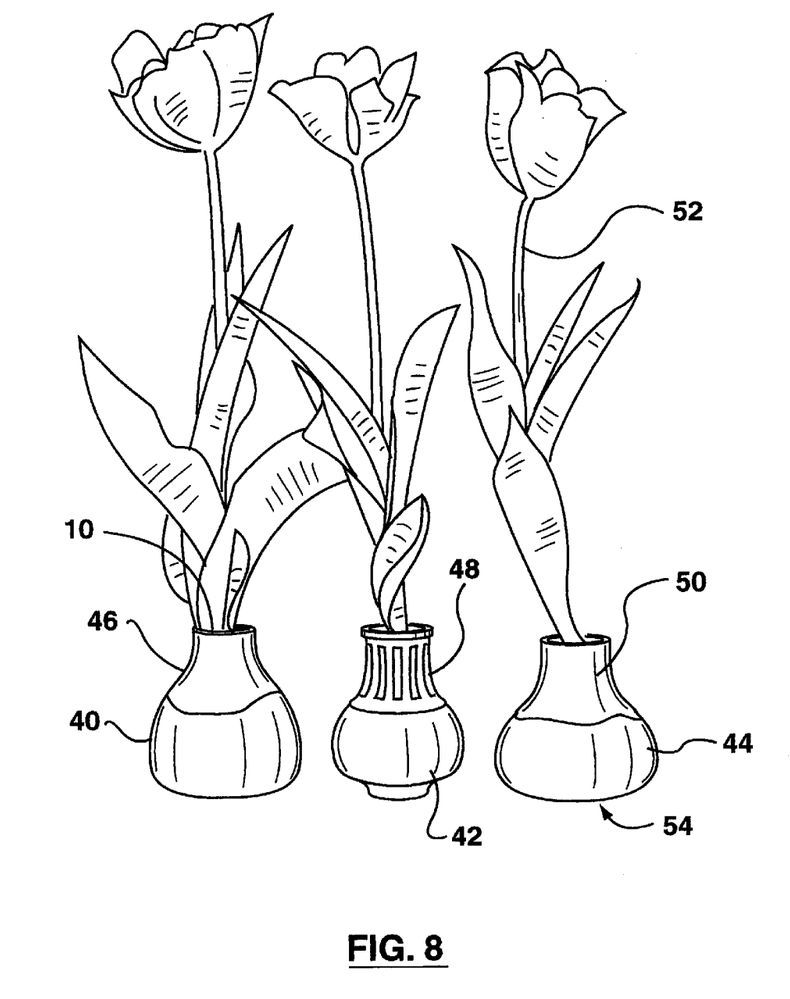
FIG. 8 is a side elevational view of three other embodiments of the invention.

FIG. 8 shows other embodiments of the invention whereby the container 2 includes upper sidewall section 36 and lower sidewall section 38 which is split along the line 34. The split 34 may be substantially linear as shown by the middle container 2 as shown in FIG. 8 or may be non-linear as shown by the left and right containers as shown in FIG. 8.

Furthermore the container 2 may include a variety of shapes 40, 42 and 44 of the lower sidewall section as well as a variety of upper sidewall sections 46, 48 and 50 as shown in FIG. 8, so as to provide a variety of pleasing decorative shapes which are aesthetic to the eye.

Moreover the stem 52 of the bulb grows through the top opening 10 and may include at least one bulb.

The embodiments shown in FIGS. 5, 6, 7 and 8 will generally include a solid bottom surface 4 although the bottom surface may include drain holes 54 as required.

The containers 2 as shown in the embodiments herein are well suited for bulbous plants such as tulips, amaryllis or the like.

Moreover introducing water from the top opening 10 may water such plants.

Figure 9:
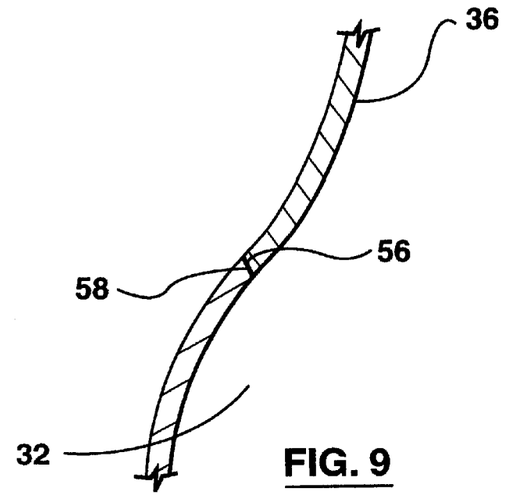
FIG. 9 is a partial cross-sectional view of the mating surfaces between the upper and lower sidewall sections.

Furthermore the mating edge 56 of upper sidewall section 36 and the mating edge 58 of lower sidewall section 38 may be orientated as shown in FIG. 9 so as to minimize the possibility of any water introduced into the container 2 from spilling out and over the outer surface of the container 2. In particular the mating edges 56 and 58 may be disposed so as to deflect any moisture back into the cavity 32. Furthermore the mating edges 56 and 58 may be orientated as shown in FIG. 9 so as to assist the registration of the mating edges of the upper sidewall section with the lower sidewall section 38.

The embodiments shown in the drawings illustrate a bottom having an opening for introducing the bulb into the cavity and removable means for closing said opening. In the embodiment shown in FIGS. 1 and 2 such removable means comprises a plug 16 for closing the opening 14 in the bottom 4.

FIG. 3 illustrates the removable means as comprising a bottom wall 18 adapted to embrace the side of the sidewall 8. In particular the bottom wall 18 closes the opening 14.

The removable means in FIGS. 5, 6, 7, 8 and 9 comprises:
(a) the upper sidewall section 36 which presents the top opening 10;
(b) the lower sidewall section 38 presenting the bottom 4 said upper and lower sidewall sections;
(c) separable from one another so as to permit introduction of said bulb into the cavity 32;
(d) registrable with one another in mating fashion so as to contain the bulb 12 in cavity 32.

FIGS. 5–9 illustrate a method of planting a bulb or the like in a container 2 having upper and lower mating and separable sidewalls sections 36 and 38, where said sidewall sections extend generally inwardly from a bottom surface 4 to a top opening 10 so as to define a cavity 32, such method comprising the steps of:
(a) separating the upper sidewall section 36 from the lower sidewall section 38;
(b) placing soil and a bulb 12 into the lower sidewall section 38;
(c) placing said upper sidewall section 36 into registrable mating disposition with the lower sidewall section 38.

The stem 52 of the bulb 12 grows through the top opening 10 as illustrated by the drawings.

Figure 10:
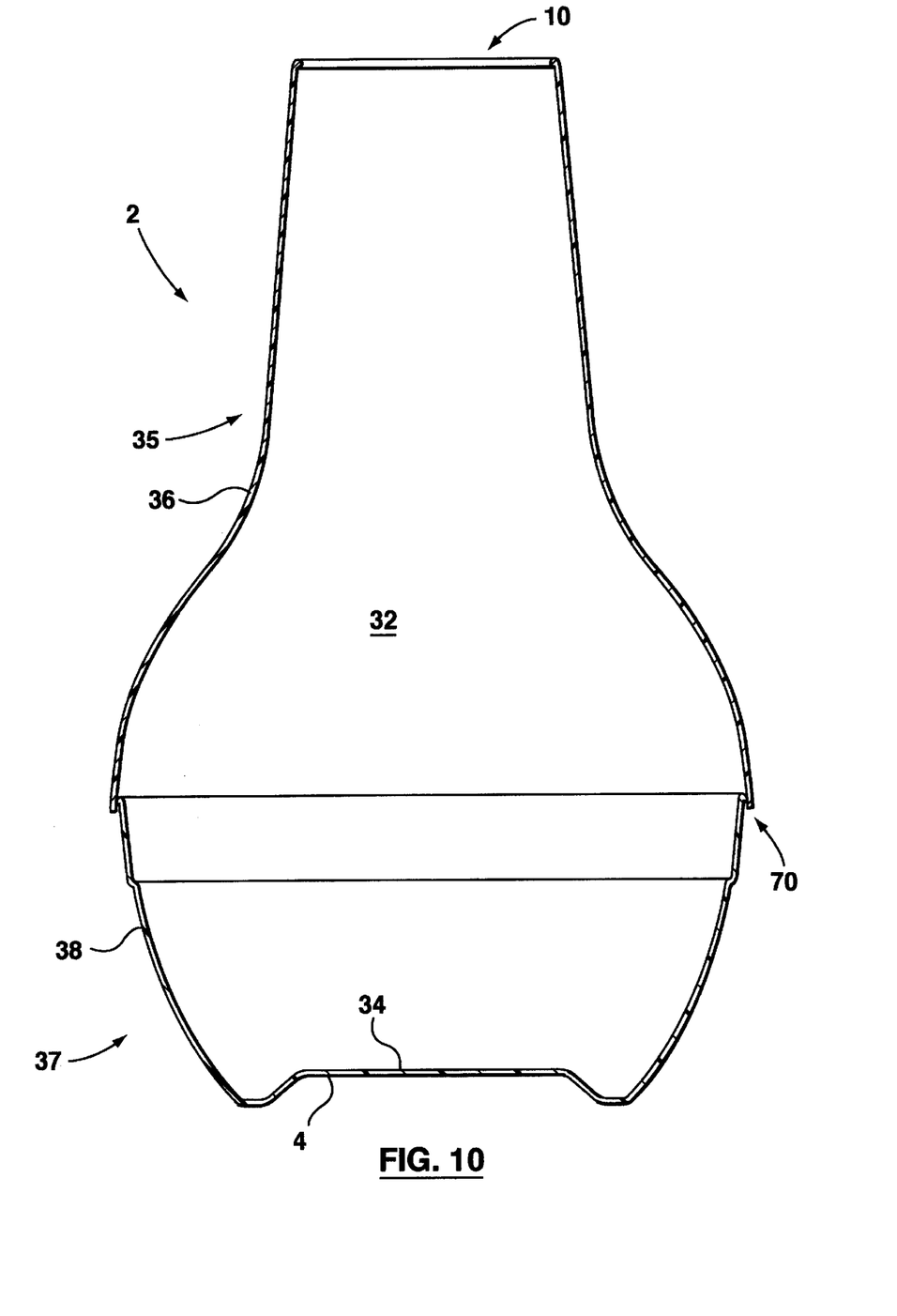
FIG. 10 is a side cross-sectional view of another embodiment of the invention.

FIG. 10 is a cross-sectional view of another embodiment of the invention where the container 2 has an upper section 35 and a lower section 37 which are generally circular in cross-section and co-axially disposed relative to one another. More specifically, the container 2 includes upper sidewall section 36 and lower sidewall section 38. The lower section 37 includes a bottom surface 4 which merges with upstanding lower sidewall section 38. Drain holes 54 may be presented in the bottom surface 4. Furthermore, the upper section 35 includes a top opening 10.

In the embodiment show in FIG. 10, fastening means 70 are associated with the upper and lower sections 35 and 37 respectively for fastening the upper section 35 to the lower section 37.

Figures 11, 12:
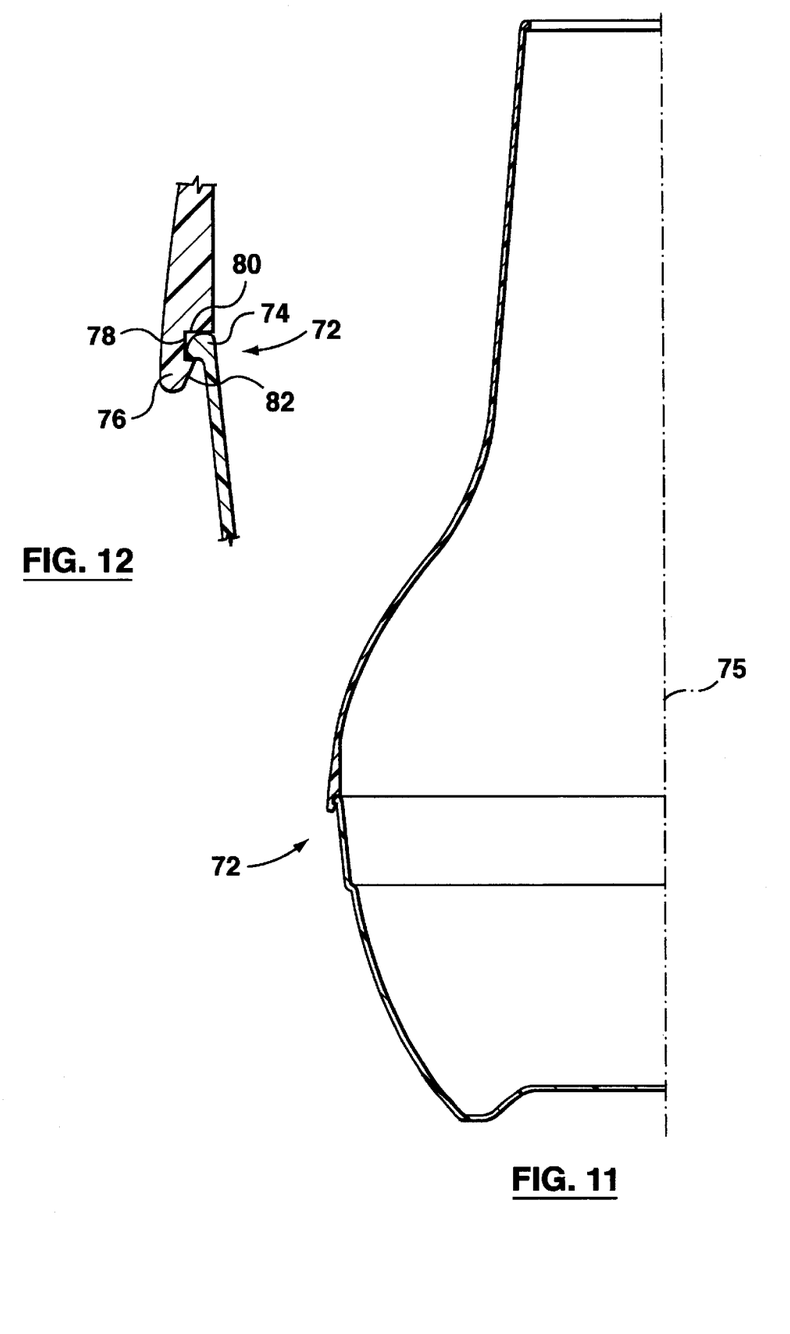
FIG. 11 is a partial cross-sectional side elevational view of FIG. 10.
FIG. 12 is an exploded view of the fastening means of FIG. 11.

More specifically, FIG. 11 illustrates one embodiment of the fastening means 70 which comprises of displaceable means 72 which in the exploded view of FIG. 12 comprises of a lip, extension or protrusion 74 which is adapted to be captured by a capturing means 76. The capturing means comprises of a recess 78 which is adapted to receive the lip 74. The recess 78 may be an annular recess or a recess which is presented along portions of the upper section 35.

More specifically the lip 74 can be presented by one of the upper or lower sections 35 or 37 while the capturing means 76 is presented by the other one of said upper section 35 or lower section 37. In the embodiment shown in FIG. 11 and 12, the displaceable means or lip 74 is presented by the lower section 37 and the capture means as presented by the upper section 35. The capture means comprises of an annular recess 78 presented by the upper section 35 while the displaceable means or lip comprises an annular lip presented by the upper part of lower section 37.

In one embodiment the upper and lower sections 35 and 37 comprise of plastic which are flexible. In operation, the upper section 35 is aligned with the lower section 37 in a coaxial manner along the axis 75 and the upper section 37 is pressed down over the lower section 37 whereby the annular lip 74 is displaced slightly inwardly, i.e. radially inwardly in reference to the axis 75 so as to permit the bevelled surface 80 of lip 74 to contact the angled guide surface 82. Upon further pressing down on the upper section 35 over the lower section 37 the annular lip 74 will be displaced inwardly so as to be "snapped" into place into the annular recess 78 so as to be captured thereby. In other words the fastening means comprises pressure applied snap locks.

The size and material of the displaceable means 74 and capture means 76 is selected so that the upper section 35 will not separate from the lower section 37 when someone lifts the upper section with the container filled with soil and the plant.

Figure 13:
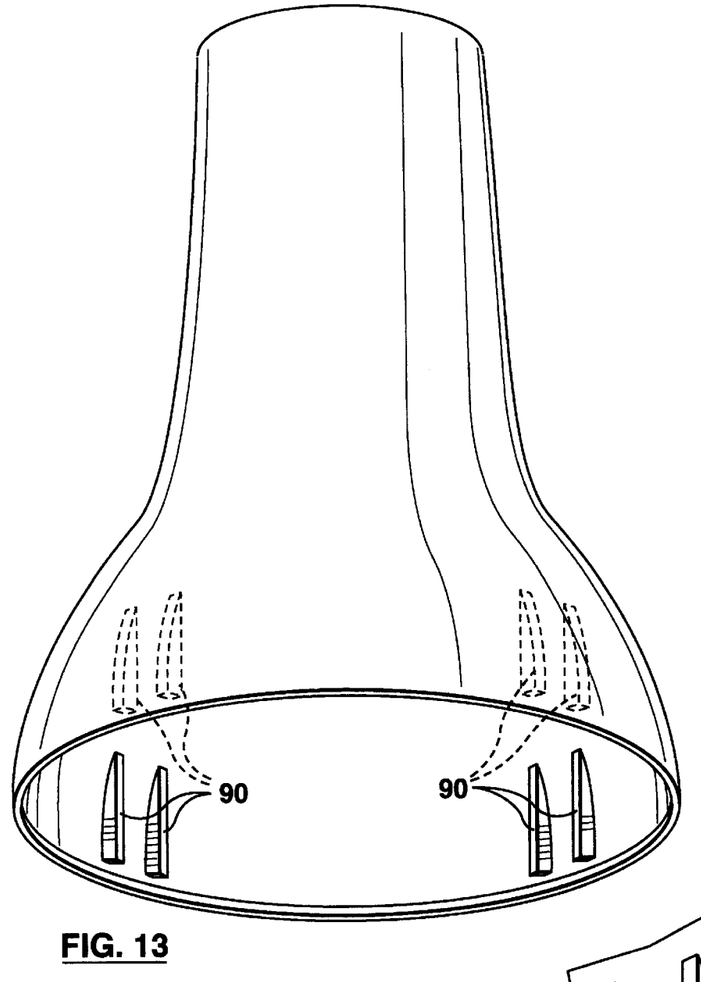
FIG. 13 is a perspective view of the upper section illustrating stop means.
Figure 13A:
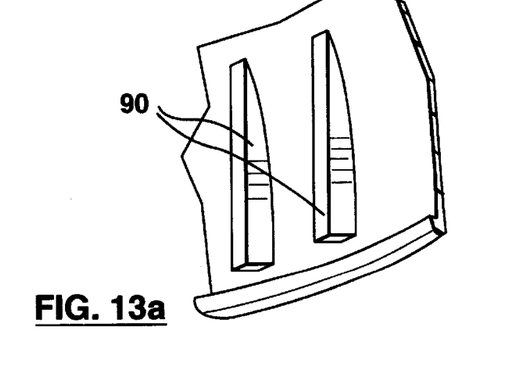
FIG. 13a is a partial exploded view of FIG. 13.
Figure 14:
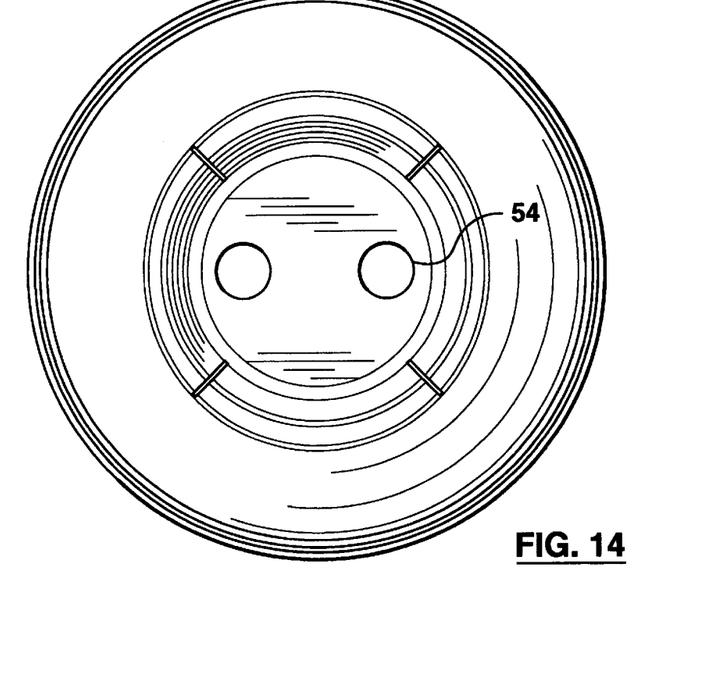
FIG. 14 is a bottom view of FIG. 10.

FIG. 13 illustrates that a stop means 90 may be presented which comprise of vertical ribs 90 so as to prevent the upper section 35 from being displaced any further relative the lower section 37 once the displaceable means 74 are captured by the capture means 76. Furthermore, the stop means or ribs 90 serve to rigidify the upper section. The stop means shown in the figures are disposed interiorly of the upper section 35 adjacent the capturing means 76.

As seen in FIGS. 10–13 the plant container 2 comprises:

(a) a lower section 37 which presents upstanding sidewalls 38;

(b) an upper section 35 presenting upper sidewalls 36 separable from and registrable with the lower sidewalls 38 to define a cavity 32 therein, said upper section 35 presenting a top opening 10 communicating with the cavity 32;

(c) the lower sidewalls 38 presenting a lip means 74 at the upper end thereof;

(d) the upper upstanding sidewalls 36 presenting means 74 for capturing said lip means 74 to prevent separation of the upper section 36 from the lower section 38 when lifting the upper section.

The weight of the lower section 37 is selected to minimize the tipping over of the container 2 when the container contains a plant and soil. Alternatively the lower section may be made wider and therefore cover more surface area for increased stability depending on test results from different bulb variations.

Moreover, the upper section 35 presents the stop means 90 for preventing further travel of the upper section 35 relative to the lower section 37 when the lip 74 is captured by the capture means 76.

The invention described herein further relates to a method of planting a bulb in a container which comprises the steps of:

(a) introducing a bulb within the confines of the base upstanding sidewalls 38;

(b) aligning the upper section 35 over the lower section 37;

(c) displacing the upper section 35 and the lower section 37 towards one another from a first separated position to a second locked position where the displaceable means 74 is captured by the capturing means 76;

(d) then filling the cavity 32 defined by the lower section 35 and upper section 37 with soil.

Figure 15:
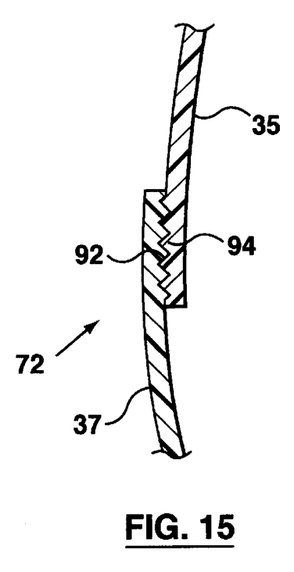
FIG. 15 is another embodiment of the invention whereby the fastening means comprise of threads.

FIG. 15 also illustrates another embodiment of the invention whereby the fastening means 72 comprises threads 92 presented by the lower section 37 and threads 94 presented by the upper section 35 rotatably registrable with the threads 92 of the lower section 37. More specifically, the upper section 35 presents threads 92 exteriorly of the upper sidewalls 36 and the lower section 37 presents threads 92 interiorly of the lower sidewalls 38.

Figure 16:
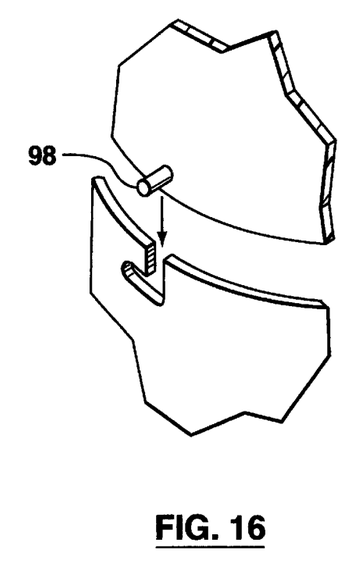
FIG. 16 is another embodiment of the invention illustrating bayonet connection.

Moreover FIG. 16 illustrates another embodiment of the invention whereby the fastening means comprises a bayonet means 98.

It should be apparent that the various features or structures found throughout FIGS. 1–16 may be mixed; for example the separation of FIG. 10 could be curved as shown in FIG. 5.

The container 2 as shown herein provides an aesthetically pleasing shape. Furthermore the method of planting a bulb or the like with the container 2 shown herein may be quickly and easily performed and well adapted for automated means.

Various embodiments of the invention have now been described in detail.

Since changes in and/or additions to the above-described best mode may be made without departing from the nature, spirit or scope of the invention, the invention is not to be limited to said details.

What is claimed is:

1. A plant container comprising:

(a) a lower section presenting upstanding side walls;

(b) an upper section presenting upper side walls separable from and axially registrable with said lower side walls to define a cavity therein, said upper section presenting a top opening communicating with said cavity;

(c) said lower side walls presenting a lip means extending radially outwardly;

(d) said upper upstanding side walls presenting means for capturing said lip means to prevent separation of said upper section from said lower section when lifting said upper section;

(e) said capture means comprising an annular recess for capturing said lip means;

(f) wherein said upper side walls include an angled guide surface for contacting and displacing said lip means when said lip is placed into said recess.

2. A plant container as claimed in claim 1 wherein said lip means includes a bevelled surface for contacting said angled guide surface for displacing said lip means when said lip means is placed into said recess.

3. A method of planting a bulb in a container having a lower section with upstanding side walls and an upper section having upper side walls and a top opening, said upper section separable from and axially registrable with said lower section, said lower side walls presenting an annular lip which extends radially outwardly and said upper upstanding side walls presenting an annular recess comprising the steps of:

(a) introducing a bulb within the confines of said lower upstanding side walls;

(b) axially aligning said upper section over said lower section;

(c) displacing said upper section and said lower section towards one another from a first separated position to a second locked position wherein said annular lip displaced slightly inwardly wherein said upper section contacts said lower section so as to capture said lip in said recess;

(d) filling the cavity defined by said lower section and said upper section with soil;

(e) wherein said annular lip presents a bevelled surface, and said capture means presents an angled guide surface for displacing said lip into said recess.

4. A method as claimed in claim 3 wherein said annular lip of the displaceable means is displaced radially inwardly so as to permit the bevelled surface of the annular lip to contact the angled guide surface of the capture means so as to permit the annular lip to be captured by the annular recess.

* * * * *